United States Patent
Sinzawa et al.

(10) Patent No.: US 6,729,751 B2
(45) Date of Patent: May 4, 2004

(54) ROOM LAMP FIXING STRUCTURE

(75) Inventors: Kouichi Sinzawa, Saitama Prefecture (JP); Hirofumi Okano, Saitama Prefecture (JP)

(73) Assignee: Kabushiki Kaisha T AN T, Saitama Prefecture (JP)

( * ) Notice: Subject to any disclaimer, the term of this patent is extended or adjusted under 35 U.S.C. 154(b) by 0 days.

(21) Appl. No.: 10/235,642

(22) Filed: Sep. 6, 2002

(65) Prior Publication Data

US 2003/0072163 A1 Apr. 17, 2003

(30) Foreign Application Priority Data

Oct. 12, 2001 (JP) ........................................ 2001-315417

(51) Int. Cl.$^7$ ................................................ B60Q 1/26
(52) U.S. Cl. .................... 362/493; 462/147; 462/546
(58) Field of Search .................... 362/478, 479, 362/490, 493, 546, 549, 147

(56) References Cited

U.S. PATENT DOCUMENTS 6,467,937 B2 * 10/2002 Nagata et al. .............. 362/490
6,595,668 B2 * 7/2003 Hatagishi et al. ........... 362/490

FOREIGN PATENT DOCUMENTS

JP          6-65093          9/1994

* cited by examiner

Primary Examiner—Sandra O'Shea
Assistant Examiner—Ali Alavi
(74) Attorney, Agent, or Firm—Nixon & Vanderhye P.C.

(57) ABSTRACT

There is provided a room lamp fixing structure to fix a room lamp 3 in the automobile roof panel 1, said structure including a fixing hole 22 provided in a trim 2 to be fixed in the roof panel; a plurality of projections 23 provided in said trim 2; and room lamp fixing means R including a plurality of engagement recesses 31a with which said plurality of projections 23 come into engagement upon insertion of the housing into said fixing hole 22 to fix said room lamp 3 to said trim, said trim 2 being fixed to said roof panel 1 by means of trim/room lamp fixing means for fixing to the roof panel.

3 Claims, 3 Drawing Sheets

ROOM LAMP FIXING STRUCTURE

BACKGROUND OF THE INVENTION

The present invention relates to a room lamp fixing structure in an automobile and more particularly to a room lamp fixing structure in which a room lamp is first attached to a trim before said trim thus attached with the room lamp is mounted to the automobile roof panel such that said room lamp is mounted to the roof panel together with the trim.

Conventionally, the room lamp fixing structure of this type was disclosed in Japanese Utility Model Laid Open to Public No. 6-65093. This device is structured such that a trim and a room lamp are mounted to the roof panel by pinching the trim between the flange of the room lamp and the bracket with a leaf spring forming said bracket, the tip end spring portion of said bracket being brought into engagement with an engagement hole formed in the roof panel.

In said prior art, the room lamp is mounted to the trim by inserting the room lamp into a lamp attaching hole formed in the trim; and the bracket is pressed into the clip of the room lamp such that the edge of the trim is held between the bracket and the body of the room lamp to involve troublesome work in attaching the room lamp to the trim.

Further, since the trim is attached to the roof panel at a different attaching position, said bracket is merely resiliently engaged in the hole to make the trim dangle from the roof panel; that is, the trim and the roof panel is not directly attached with each other with the result this very shaky attachment can lead to the generation of noise due to the vibration of the vehicle in motion and the play therefrom.

SUMMARY OF THE INVENTION

The present invention was made in order to solve the above mentioned problems and its object is to provide a room lamp fixing structure which can reduce the man hour for the assembly work on the assembly line of the automobile and which is free from the play due to vibration and the noise because the room lamp and the trim are fixed to the roof panel.

In order to realize the object of the invention, there is essentially provided a room lamp fixing structure in which a room lamp is fixed to the automobile roof panel, said structure comprising a room lamp fixing hole provided in the trim to be fixed to the roof panel; a plurality of projections provided in said trim; room-lamp-to-trim fixing means including a plurality of engagement recesses provided in the housing of said room lamp to receive said plurality of projections upon insertion of said housing into said room lamp fixing hole; and trim/room-lamp-to-roof-panel to fix said trim to said room lamp.

In the above mentioned room lamp fixing structure, said trim fixing means may include a fixing hole provided in the roof panel, a plurality of engagement step to come into engagement with the underside of said trim upon insertion of said housing into said fixing hole; and a plurality of elastic pinching piece provided in said housing to pinch said roof panel and said trim in cooperation with said plurality of engagement steps.

In the above mentioned room lamp fixing structure, said plurality of projections may have sides increasingly coming closer to each other toward the tip portions thereof, said plurality of projections coming into engagement with said plurality of recesses, said sides coming into engagement with the outer edge of said engagement recesses to restrain said room lamp from moving to and fro and right to left.

DETAILED EXPLANATION OF THE EMBODIMENT

Figure 1:
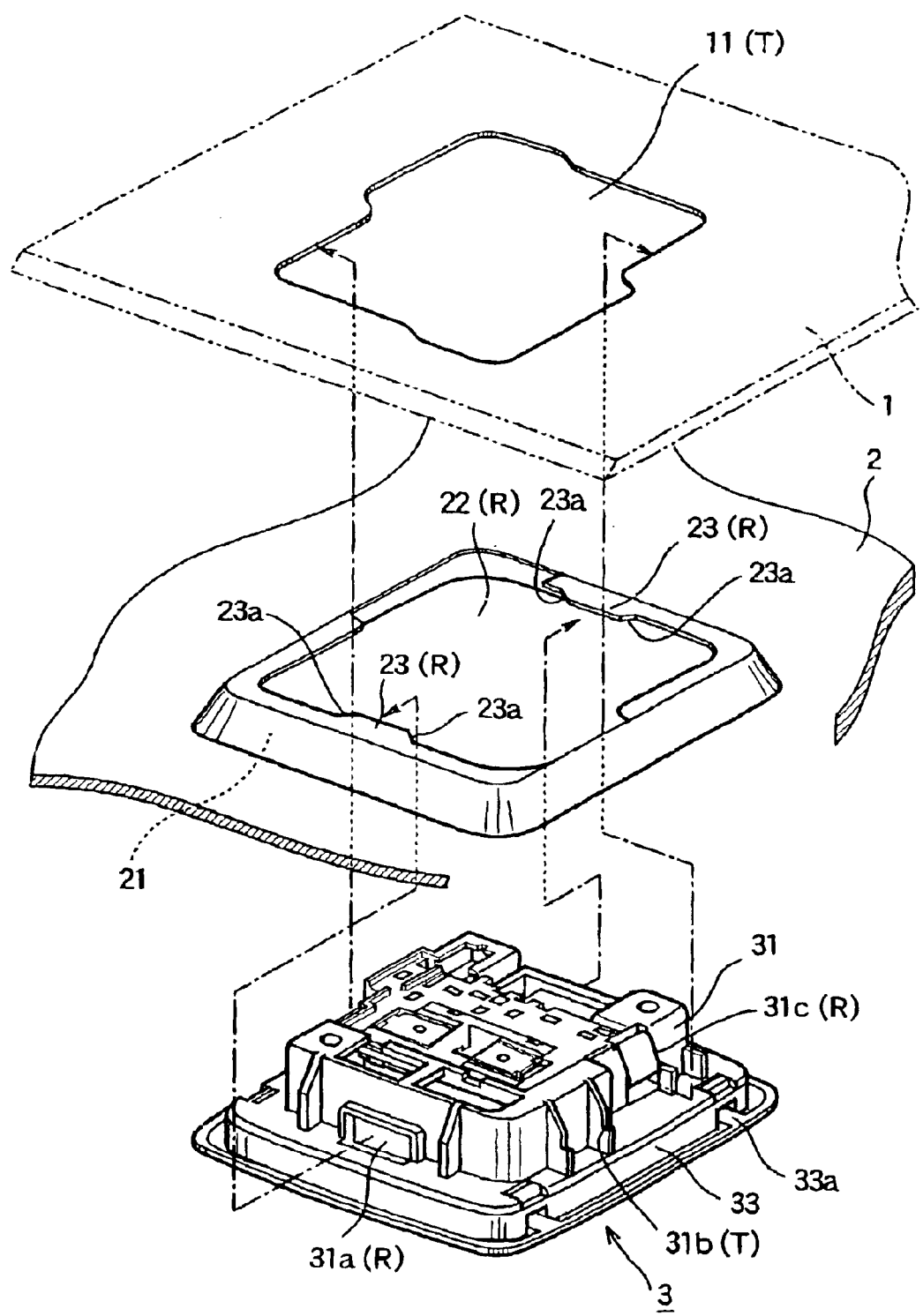
FIG. 1 is an exploded perspective view of one embodiment of the invention directed to the fixing structure of the room lamp.
Figure 2:
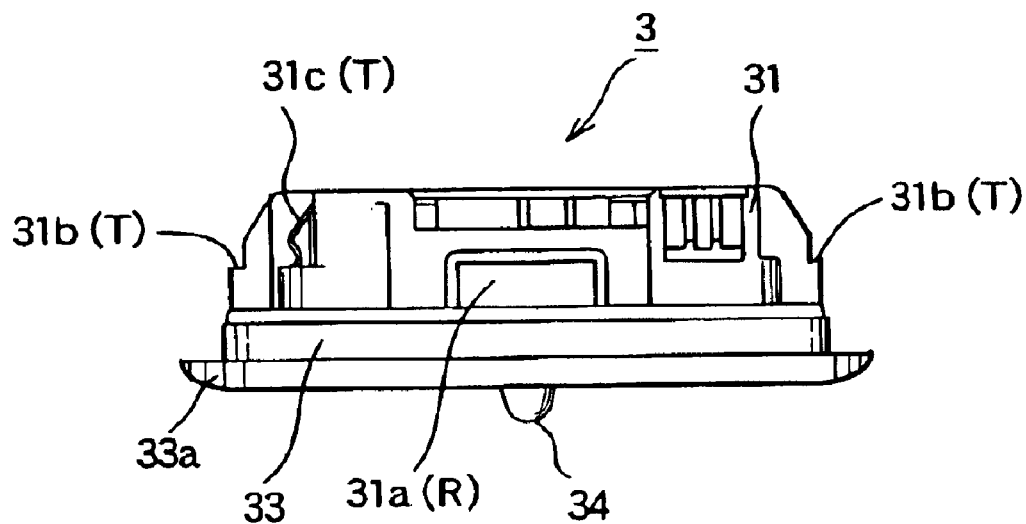
FIG. 2 is a front view of the room lamp of FIG. 1 as viewed from the left bottom side thereof.
Figure 3:
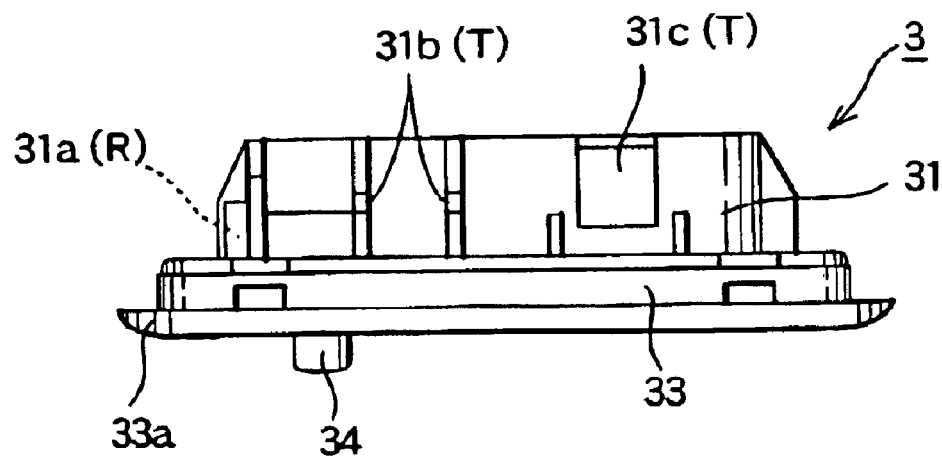
FIG. 3 is a side elevation of the room lamp of FIG. 1 as viewed from the right bottom side thereof.
Figure 4:
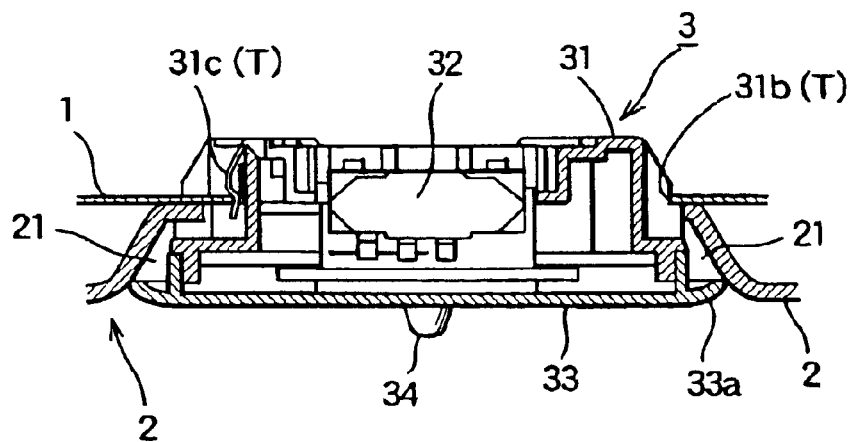
FIG. 4 is a sectional view of the room lamp being secured.
Figure 5:
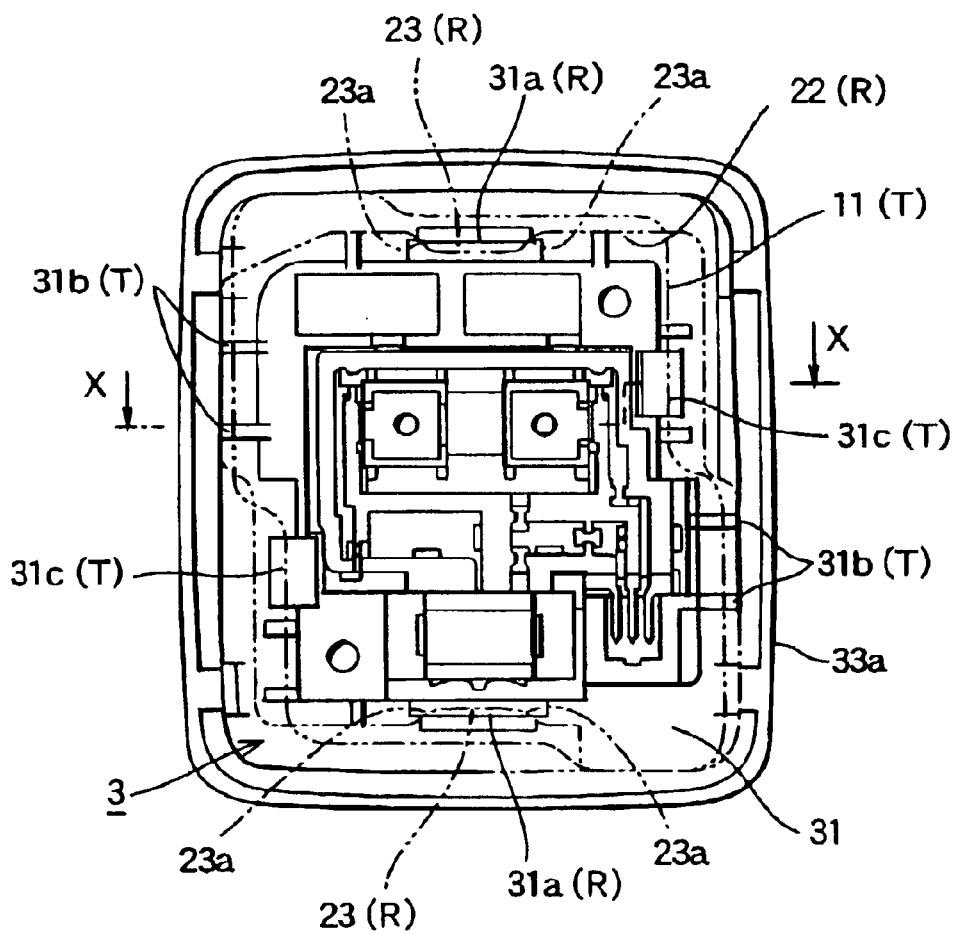
FIG. 5 is an explanatory view showing the relationship of the fixing hole of the roof panel, the room lamp fixing hole of the trim and the room lamp.

FIG. 1 is an exploded perspective view of one embodiment of the invention directed to the fixing structure of the room lamp; FIG. 2 is a front view of the room lamp of FIG. 1 as viewed from the left bottom side thereof; FIG. 3 is a side elevation of the room lamp of FIG. 1 as viewed from the right bottom side thereof; FIG. 4 is a sectional view of the room lamp being secured; and FIG. 5 is an explanatory view showing the relationship of the fixing hole in the roof panel, the room lamp fixing hole in the trim and the room lamp.

Referring to FIG. 1, the numeral 1 denotes a roof panel forming part of the vehicle body, said roof panel 1 being mounted to a ceiling frame not shown and being formed with a fixing hole 11 to fix a trim 2 and a room lamp 3 therethrough which will be explained later.

The numeral 2 denotes the trim, which is composed of a polyurethane foam substrate and a covering member to felt the underside of said substrate. The underside of said trim 2 is formed with a recess 21 extending upwardly which is sized to receive the room lamp 3 therein. Said recess 21 has a ceiling formed with a room lamp fixing hole 22 and said trim 2 is formed with a pair of projections 23 jutting out into said hole 22. Each projection has an inwardly increasingly narrower width defined by sides 23a convergent toward a tip end thereof.

The numeral 3 denotes a room lamp composed of a synthetic resin housing 31, a light source bulb 32 accommodated in said housing 31, a lens 33 having a flange 33a projecting outwardly outside of the housing 31, and an operating knob 34 attached to a switch (not shown) such that an operating portion thereof extends downwardly from the lens 33.

Further, said housing 31 has outer sides integrally formed with engagement recesses 31a to come into registration with the two projections 23 of said trim 2 for engagement, respectively. Further, said housing 31 is integrally formed with engagement steps 31b to come into engagement with the underside face of the trim 2 upon said housing 31 being inserted into said fixing hole 22. Further, at a position away from said engagement steps, a pair of resilient pinching members 31c are provided symmetrically with respect to a center thereof.

It is to be noted that said pair of resilient pinching members 31c are made of metal plates and attached to the housing 31.

Said room lamp fixing hole 22, said projections 23 and said engagement recesses 31a constitute room lamp fixing means R for fixing to the trim 2, which means secures the room lamp to the trim. Further, said fixing hole 11, said engagement steps 31b and said resilient pinching members 31c constitute room lamp fixing means T which secures the trim and the room lamp to the roof panel.

Next, an explanation will be explained concerning the fixing of the room lamp 3.

First, the housing 31 is positioned between the trim 2 and the lens 33 such that the respective engagement recesses 31a come into facing relation to the projections 23. Then, the housing 31 is inserted into the room lamp fixing hole 22 to cause the respective projections 23 to warp under the pressure of the housing 31 and the flange 33a to abut against the inside of the recess 21 with the respective projections 23 being pushed into the engagement recesses 31a such that the room lamp 3 is fixed to the trim 2 by the room lamp fixing means R.

In this way, if the room lamp 3 is secured to the trim 2 by means of the room lamp fixing means R, part of both convergent sides 23a (slope) of each projection 23 which become narrower increasingly toward the tip thereof comes into contact with an outer edge of the inner periphery of the engagement recess 31a such that the room lamp 3 is restrained from moving to-and-fro and left-to-right, eliminating chattering with the trim 2.

Similarly, the underside of the trim 2 contacts the respective engagement steps 31b such that the room lamp 3 is restrained from moving to-and-fro and left-to-right relative to the edge of the room lamp by the edge of the room lamp fixing hole 22, eliminating chattering with the trim 2.

When the housing 31 is inserted into the fixing hole 11 after the room lamp 3 is secured to the trim 2 as stated above, each resilient pinching member 31c warps under pressure from the edge of the roof panel 1 and thereafter, regains the original shape by its own elasticity. Further, with the respective engagement steps 31b abutting by way of the trim 2 against the roof panel 1, said engagement steps 31b and the respective resilient pinching members 31c hold the roof panel 1 and the trim 2 therebetween such that the trim 2 and room lamp 3 are fixed to the roof panel 1 by means of room lamp/trim fixing means T for fixing to the roof panel.

In case where the trim 2 is secured to the roof panel 1 by means of the room lamp fixing means T for fixing to the trim, the respective resilient pinching members 31c have tip ends on the pinching side, which protrude from the roof panel 1 to the lens 33.

As described above, the present invention facilitates the reduction of assembling man hour on the assembly line of automobile manufacturing because the room lamp can be attached to the trim at a touch by means of the room lamp fixing means for fixing to the trim.

Then, the opposite convergen sides forming the sides of each projection become narrower increasingly toward the tip end thereof to allow part of the respective sides to come into contact with the outer edges of the inner periphery of the engagement recess such that the room lamp can be attached without any play to and fro and left to right in relation to the trim.

Further, the reduction of assembling man hour on the assembly line of automobile manufacturing has become possible because the room lamp and the trim can be attached to the roof panel at a touch by means of the roof trim/room-lamp fixing means for fixing to the roof panel.

Further, with the roof panel and the trim being held by means of the engagement steps and the resilient pinching members formed respectively in the room lamp, the mounting of the trim to the roof panel becomes very stable, thus preventing the chattering otherwise produced by the vibration while the automobile is in motion and the accompanying production of noise.

What is claimed is:

1. A room lamp fixing structure comprising a room lamp fixing hole provided in a trim to be fixed to a roof panel;

a plurality of projections provided in said trim; and first fixing means provided in said housing of the room lamp for fixing to the trim and including a plurality of engagement recesses with which said plurality of projections come into engagement upon insertion of said housing into said room lamp fixing holes to fix said room lamp to said trim; and second fixing means for fixing said trim to said roof panel, wherein said second fixing means includes a fixing hole provided in the roof panel; a plurality of engagement steps provided in the housing of said room lamp to come into engagement with the underside of said trim upon insertion of said housing into said fixing hole; and a plurality of elastic pinching members provided in said housing to pinch said roof panel and said trim in cooperation with said plurality of engagement steps.

2. A room lamp fixing structure according to claim 1, wherein said plurality of projections each have convergent sides increasingly narrower toward a tip end thereof, said plurality of projections being adapted to come into engagement with said plurality of engagement recesses such that said converging sides abut against the outer edge of said engagement recesses to restrain said room lamp from moving to and fro and left to right relative to said trim.

3. A room lamp fixing structure comprising:

a room lamp fixing hole provided in a trim to be fixed to a roof panel;

a plurality of projections provided in said trim; and first fixing means provided in said housing of the room lamp for fixing to the trim and including a plurality of engagement recesses with which said plurality of projections come into engagement upon insertion of said housing into said room lamp fixing holes to fix said room lamp to said trim; and second fixing means for fixing said trim to said roof panel, wherein said plurality of projections each have convergent sides increasingly narrower toward a tip end thereof, said plurality of projections being adapted to come into engagement with said plurality of engagement recesses such that said converging sides abut against the outer edge of said engagement recesses to restrain said room lamp from moving to and fro and left to right relative to said trim.

* * * * *